United States Patent
Du et al.

(10) Patent No.: US 9,350,721 B2
(45) Date of Patent: May 24, 2016

(54) AIR INTERFACE SECURITY METHOD AND DEVICE

(71) Applicant: China IWNCOMM Co., Ltd., Shaanxi (CN)

(72) Inventors: Zhiqiang Du, Shaanxi (CN); Manxia Tie, Shaanxi (CN); Guoqiang Zhang, Shaanxi (CN)

(73) Assignee: China IWNCOMM Co., Ltd., Shaanxi (CN)

( * ) Notice: Subject to any disclaimer, the term of this patent is extended or adjusted under 35 U.S.C. 154(b) by 0 days.

(21) Appl. No.: 14/394,036

(22) PCT Filed: Mar. 14, 2013

(86) PCT No.: PCT/CN2013/072632
§ 371 (c)(1),
(2) Date: Oct. 10, 2014

(87) PCT Pub. No.: WO2013/152653
PCT Pub. Date: Oct. 17, 2013

(65) Prior Publication Data
US 2015/0089588 A1    Mar. 26, 2015

(30) Foreign Application Priority Data
Apr. 11, 2012 (CN) .......................... 2012 1 0121152

(51) Int. Cl.
| | | |
|---|---|---|
| H04L 29/00 | (2006.01) | |
| H04L 29/06 | (2006.01) | |
| G06F 21/30 | (2013.01) | |
| G06F 21/44 | (2013.01) | |
| H04W 12/06 | (2009.01) | |
| H04L 9/32 | (2006.01) | |
| H04L 9/08 | (2006.01) | |

(52) U.S. Cl.
CPC ............... *H04L 63/08* (2013.01); *G06F 21/30* (2013.01); *G06F 21/44* (2013.01); *G06F 21/445* (2013.01); *H04W 12/06* (2013.01); *H04L 9/0861* (2013.01); *H04L 9/32* (2013.01); *H04L 9/3236* (2013.01); *H04L 2209/805* (2013.01)

(58) Field of Classification Search
CPC ............. H04L 9/08; H04L 9/32; H04L 63/04; H04L 63/06; H04L 63/08; G06F 21/03; G06F 21/44

USPC ................ 726/1–21; 713/155–174, 182–186; 380/255–262, 277–30; 340/5.1–5.86, 340/10.4–10.52
See application file for complete search history.

(56) References Cited

U.S. PATENT DOCUMENTS

| | | | | |
|---|---|---|---|---|
| 6,772,331 | B1 * | 8/2004 | Hind | G06F 21/445 370/313 |
| 8,774,041 | B2 * | 7/2014 | Akay | H04W 52/0245 370/252 |
| 2005/0287950 | A1 | 12/2005 | Helden et al. | |
| 2010/0001840 | A1 * | 1/2010 | Kang | H04Q 9/00 340/10.1 |
| 2010/0243738 | A1 * | 9/2010 | Shimizu | G06K 7/0008 235/439 |
| 2010/0277287 | A1 * | 11/2010 | Choi | H04L 9/3273 340/10.42 |
| 2011/0210831 | A1 | 9/2011 | Talty et al. | |

FOREIGN PATENT DOCUMENTS

| | | |
|---|---|---|
| CN | 101038619 A | 9/2007 |
| CN | 101114901 A | 1/2008 |
| WO | WO 2007/147306 A1 | 12/2007 |

OTHER PUBLICATIONS

International Search Report issued in PCT/CN2013/072632, mailed Jun. 20, 2013.
Identification cards—Contactless integrated circuit cards—Proximity cards-; Part 4: Transmission protocol; ISO/IEC, Jul. 15, 2008, pp. i-38.
Extended EP Search Report issued in EP counterpart Application No. 13775724.1, on Nov. 23, 2015.

* cited by examiner

*Primary Examiner* — Madhuri Herzog
(74) *Attorney, Agent, or Firm* — Greer Burns & Crain Ltd.

(57) ABSTRACT

Provided is an air interface security method. In the process of protocol transmission, the method executes: 1) a short-range coupling device sending a security parameter request message to a short-range card; 2) after receiving the security parameter request message, the short-range card conduct security parameter feedback on the short-range coupling device; and 3) the short-range coupling device and the short-range card establish a security link according to a security parameter. Provided are a short-range coupling device, a short-range card, etc. for achieving the method. By introducing a security mechanism, the present invention provides a security protection capability for an air interface, can provide identity authentication for a short-range coupling device and a short-range card to ensure the validity and authenticity of the identities of both sides in the communications, and at the same time, will not bring additional hardware overhead to the short-range coupling device and the short-range card.

15 Claims, No Drawings

AIR INTERFACE SECURITY METHOD AND DEVICE

This application is a US National Stage of International Application No. PCT/CN2013/072632, filed on 14 Mar. 2013, designating the United States, and claiming priority from Chinese Patent Application No. 201210121152.8, filed with the Chinese Patent Office on Apr. 11, 2012 and entitled "Air interface security method and device", which are hereby incorporated by reference in their entirety.

FIELD OF THE INVENTION

The present invention relates to the field of network security among information security technologies, and particularly to an air interface security method and device.

BACKGROUND OF THE INVENTION

The ISO/IEC 14443 standard includes four parts, i.e., physical characteristics, radio frequency interface energy and signal interfaces, initialization and anti-collision, and transmission protocols, and also includes two patterns, i.e., Type A and Type B. This standard solves the technical problems in the communication field of passive (no power supply in a card) and non-contact, and has the feature of more rapid and convenient communication. At present the ISO/IEC 14443 Type A has been widely applied to mobile payment, channel control, charging in public transportation, checking work attendance, access control, etc., and the Type B has been primarily applied to the second generation of resident identity cards in P. R. China, both of which have very broad application prospects.

The ISO/IEC 14443 standard relates to communication via an air interface without any physical or visual contact, and this feature enables it to be widely applied but at the same time causes it to face a variety of security threats. For example, an attacker may listen to or illegally intercept information exchanged between a proximity card and a proximity coupling device; falsify the legal proximity card by duplicating or counterfeiting it; read remotely confidential information in the proximity card through the proximity coupling device at high radio-frequency power and then decipher the information in the proximity card by using a backend server for the purpose of obtaining illegally the information, etc., and various attacks have been emerging all the time. Due to the absence of a security protection mechanism for the air interface in the ISO/IEC 14443 standard, increasing applications of various products using this standard have come with a growing number of insecurity accidents of various applicable cards, including counterfeiting, information wiretapping, tampering, etc., thus endangering personal property and also causing social turbulence to thereby degrade public security.

SUMMARY OF THE INVENTION

In order to solve the numerous technical problems in the prior art, an embodiment of the invention provides an air interface security method including the following steps in the transmission protocol process:

1) a proximity coupling device transmitting a security parameter request message to a proximity card;

2) the proximity card feeding back security parameters to the proximity coupling device after receiving the security parameter request message; and 3) the proximity coupling device and the proximity card setting up a secure link between them according to the security parameters.

An embodiment of the invention further provides a proximity coupling device implementing the method described above, where the proximity coupling device is capable of performing the transmission protocol process and includes:

a transmission unit configured to transmit a security parameter request message to a proximity card;

a reception unit configured to receive security parameters fed back from the proximity card; and a link setup unit configured to set up a secure link with the proximity card according to the security parameters.

An embodiment of the invention further provides a proximity card implementing the method described above, where the proximity card is capable of performing the transmission protocol process and includes:

a reception unit configured to receive a security parameter request message transmitted by a proximity coupling device;

a transmission unit configured to feed back security parameters to the proximity coupling device; and a link setup unit configured to set up a secure link with the proximity coupling device according to the security parameters.

Through the introduction of the security mechanisms, the invention provides the security protection capability of the air interface to thereby provide the proximity coupling device and the proximity card with the identity authentication function so as to ensure the legality and authenticity of identities of both sides in communication without bring any additional hardware overhead of the proximity coupling device and the proximity card.

BRIEF DESCRIPTION OF THE DRAWINGS

No drawings.

DETAILED DESCRIPTION OF THE EMBODIMENTS

In order to make the objects, technical solutions and advantages of the invention more apparent, the invention will be further described below in details with reference to particular embodiments and drawings. The exemplary embodiments of the invention and the description thereof herein are used to explain the invention but not intended to limit the invention.

With an air interface security method of the invention, security mechanisms of security parameter negotiation, identity authentication, confidential communication, etc., are introduced to the transmission protocol to thereby enhance the security protection capability of the air interface of the transmission protocol. The implementation process of the air interface security method of the invention includes:

Step 1, a proximity coupling device transmits a security parameter request message, for example, including message codes, to a proximity card;

Step 2, the proximity card feeds back security parameters to the proximity coupling device after receiving the security parameter request message; and Step 3, the proximity coupling device and the proximity card set up a secure link between them according to the security parameters.

A particular embodiment of the step 1 described above can be as follows:

When the proximity coupling device and the proximity card perform the ISO/IEC 14443 transmission protocol process, the proximity coupling device transmits a Request for Answer To Select (RATS) including the security parameter request message to the proximity card to initiate the security parameter negotiation with the proximity card.

A particular embodiment of the step 2 described above can be as follows:

When the proximity coupling device and the proximity card perform the ISO/IEC 14443 transmission protocol process, the proximity card returns an Answer To Select (ATS) to the proximity coupling device after receiving the RATS of the proximity coupling device, where the ATS includes information on a support condition of the proximity card for an authentication mechanism, a cipher algorithm and other security parameters. The authentication mechanism includes but will not be limited to an authentication mechanism based on a pre-shared key or an authentication mechanism based on a certificate, and the cipher algorithm includes but will not be limited to a symmetric cipher algorithm or an asymmetric cipher algorithm.

A particular embodiment of the step 3 described above can be as follows:

After the proximity coupling device negotiates about the security parameters with the proximity card (that is, the security parameters are requested and fed back in the steps 1 and 2), both of them perform identity authentication in accordance with the authentication mechanism among the security parameters as a result of the negotiation, e.g., the authentication based on the pre-shared key or the authentication based on digital certificate. The secure link between the proximity coupling device and the proximity card is thus set up upon successful identity authentication.

In another implementation, the step 3 can further include:

The proximity coupling device can negotiate with the proximity card in the identity authentication to generate a session key so that the proximity coupling device and the proximity card can encrypt and transmit data by the session key for confidential communication. Alternatively the session key can be generated in another way such as a pre-distribution way, that is, the session key is distributed in advance to the proximity coupling device and the proximity card prior to the confidential communication.

Before the step 1, the method can further include step 0, in which the proximity card notifies the proximity coupling device of its security capability, particularly as follows:

Step 0, the proximity card notifies the proximity coupling device that the proximity card has the air interface security protection capability in communication initialization and anti-collision processes.

A particular embodiment of the step 0 is as follows:

Step 01, the proximity coupling device transmits a select command to the proximity card in ISO/IEC 14443 protocol initialization and anti-collision processes; and Step 02, the proximity card returns a response including information indicating that it supports the air interface security protection capability after receiving the select command transmitted by the proximity coupling device.

A particular embodiment of the step 02 described above can be as follows:

In the ISO/IEC 14443 protocol initialization and anti-collision processes, the proximity card transmits a Select AcKnowledge (SAK) to the proximity coupling device after receiving the select command transmitted by the proximity coupling device, where the SAK includes the information indicating that the proximity card supports the air interface security protection capability, and the information can be carried by newly adding a value to the original values of the SAK to notify the proximity coupling device selecting the proximity card that the proximity card has the air interface security protection capability.

Particular embodiments of the step 1 and the step 2 described above can be as follows:

In a first example, in the step 1 described above, when the proximity coupling device and the proximity card perform the ISO/IEC 14443 transmission protocol process, the proximity coupling device transmits the RATS including the security parameter request message to the proximity card, where the message includes all of authentication mechanisms supported by the proximity coupling device and all of cipher algorithms supported by the proximity coupling device; and in the step 2 described above, after receiving the RATS, the proximity card firstly selects a combination of one of all the authentication mechanisms supported by the proximity coupling device and one of all the cipher algorithms supported by the proximity coupling device according to a local strategy, and then returns the ATS including the combination of the authentication mechanism and the cipher algorithm to the proximity coupling device.

In a second example, in the step 1 described above, when the proximity coupling device and the proximity card perform the ISO/IEC 14443 transmission protocol process, the proximity coupling device transmits the RATS including the security parameter request message to the proximity card; and in the step 2 described above, the proximity card returns the ATS to the proximity coupling device after receiving the RATS, where the ATS includes all of authentication mechanisms supported by the proximity card and all of cipher algorithms supported by the proximity card, so that the proximity coupling device can select a combination of one of all the authentication mechanisms supported by the proximity card and one of all the cipher algorithms supported by the proximity card as the security parameters as a result of negotiation with the proximity card according to its local strategy.

In a third example, in the step 1 described above, when the proximity coupling device and the proximity card perform the ISO/IEC 14443 transmission protocol process, the proximity coupling device transmits the RATS including the security parameter request message to the proximity card; and in the step 2 described above, after receiving the RATS, the proximity card selects a combination of one of all of its supported authentication mechanisms and one of all of its supported cipher algorithms as the security parameters as a result of negotiation with the proximity coupling device, and returns the ATS including the selected combination to the proximity coupling device.

In a fourth example, in the step 1 described above, when the proximity coupling device and the proximity card perform the ISO/IEC 14443 transmission protocol process, the proximity coupling device transmits the RATS including the security parameter request message to the proximity card, where the message includes a combination of one of all of authentication mechanisms and one of all of cipher algorithms supported by the proximity coupling device, both of which are selected by the proximity coupling device; and in the step 2 described above, after receiving the RATS, the proximity card judges whether it supports the combination of the authentication mechanism and the cipher algorithm in the RATS according to the local strategy and returns the judgment result to the proximity coupling device via the ATS.

The invention further provides a proximity coupling device for implementing the air interface security method described above. The proximity coupling device includes a first transmission unit, a first reception unit and a first link setup unit.

The first transmission unit of the proximity coupling device is configured to transmit a security parameter request message to a proximity card, the first reception unit is configured to receive security parameters fed back from the proximity card, and the first link setup unit is configured to set up a secure link with the proximity card according to the security parameters.

A particular embodiment of the proximity coupling device can be as follows:

In the transmission protocol process of the ISO/IEC 14443 protocol performed by the proximity coupling device, the first transmission unit of the proximity coupling device transmits an RATS including the security parameter request message to the proximity card to initiate the security parameter negotiation with the proximity card; the first reception unit receives an ATS transmitted by the proximity card, where the ATS includes information on a support condition of the proximity card for an authentication mechanism, a cipher algorithm and other security parameters; and the first link setup unit performs identity authentication on the proximity card in accordance with the authentication mechanism among the negotiated security parameters after negotiating with the proximity card about the security parameters. The secure link between the proximity coupling device and the proximity card is thus set up upon successful identity authentication.

In another embodiment, the first link setup unit of the proximity coupling device can further negotiate with the proximity card in the identity authentication to generate a session key so that the proximity coupling device and the proximity card can encrypt and transmit data by the session key for confidential communication. Alternatively the session key can be generated in another way such as a pre-distribution way, that is, the session key is distributed in advance to the first link setup unit of the proximity coupling device and the proximity card prior to the confidential communication.

Furthermore, in another embodiment, the proximity coupling device can further receive the security capability of which the proximity card notifies the proximity coupling device, that is, the proximity coupling device receives the information indicating that the proximity card has the air interface security protection capability, of which the proximity card notifies the proximity coupling device, in communication initialization and anti-collision processes. In a preferred embodiment, during the ISO/IEC 14443 protocol initialization and anti-collision processes, the first transmission unit of the proximity coupling device transmits a select command to the proximity card; and the first reception unit receives information indicating that the proximity card supports the air interface security protection capability, of which the proximity card notifies the proximity coupling device, where the information can be included in the SAK transmitted by the proximity card and can be carried by newly adding a value to the original values of the SAK.

Particular embodiments of the first transmission unit and the first reception unit of the proximity coupling device can be as follows:

In a first example, the first transmission unit transmits the RATS including the security parameter request message to the proximity card, where the message includes all of authentication mechanisms supported by the proximity coupling device and all of cipher algorithms supported by the proximity coupling device; and the first reception unit receives the ATS transmitted by the proximity card, where the ATS includes a combination of one of all the authentication mechanisms supported by the proximity coupling device and one of all the cipher algorithms supported by the proximity coupling device, both of which are selected by the proximity card according to its local strategy.

In a second example, the first transmission unit transmits the RATS including the security parameter request message to the proximity card; and the first reception unit receives the ATS transmitted by the proximity card, where the ATS includes all of authentication mechanisms supported by the proximity card and all of cipher algorithms supported by the proximity card, so that the first link setup unit of the proximity coupling device can select a combination of one of all the authentication mechanisms supported by the proximity card and one of all the cipher algorithms supported by the proximity card as the security parameters as a result of negotiation with the proximity card according to the local strategy of the proximity card.

In a third example, the first transmission unit transmits the RATS including the security parameter request message to the proximity card; and the first reception unit receives the ATS transmitted by the proximity card, where the ATS includes a combination of one of all of authentication mechanisms and one of all of cipher algorithms supported by the proximity card, both of which are selected by the proximity card, as the security parameters as a result of the negotiation of the proximity coupling device with the proximity card.

In a fourth example, the first transmission unit transmits the RATS including the security parameter request message to the proximity card, where the message includes a combination of one of all of authentication mechanisms and one of all of cipher algorithms supported by the proximity coupling device, both of which are selected by the first link setup unit; and the first reception unit receives the ATS transmitted by the proximity card, where the ATS includes a result of judging by the proximity card whether it supports the combination of the authentication mechanism and the cipher algorithm in the RATS according to its local strategy.

The invention further provides a proximity card for implementing the air interface security method described above. The proximity card includes a second reception unit, a second transmission unit and a second link setup unit.

The second reception unit of the proximity card is configured to receive a security parameter request message transmitted by a proximity coupling device, the second transmission unit is configured to feed back security parameters to the proximity coupling device, and the second link setup unit is configured to set up a secure link with the proximity coupling device according to the security parameters.

A particular embodiment of the proximity card can be as follows:

In the transmission protocol process of the ISO/IEC 14443 protocol performed by the proximity card, the second reception unit of the proximity card receives an RATS including the security parameter request message transmitted by the proximity coupling device to initiate the security parameter negotiation with the proximity card; the second transmission unit transmits an ATS to the proximity coupling device, where the ATS includes information on a support condition of the proximity card for an authentication mechanism, a cipher algorithm and other security parameters; and the second link setup unit performs identity authentication in accordance with the authentication mechanism among the negotiated security parameters after negotiating with the proximity coupling device about the security parameters. The secure link between the proximity coupling device and the proximity card is thus set up upon successful identity authentication.

In another embodiment, the second link setup unit of the proximity card can further negotiate with the proximity coupling device in the identity authentication to generate a session key so that the proximity card and the proximity coupling device can encrypt and transmit data by the session key for confidential communication. Alternatively the session key can be generated in another way such as a pre-distribution way, that is, the session key is distributed in advance to the second link setup unit of the proximity card and the proximity coupling device prior to the confidential communication.

Furthermore, in another embodiment, the proximity card can further notify the proximity coupling device of its security capability, that is, the proximity card notifies the proximity coupling device that it has the air interface security protection capability in communication initialization and anti-collision processes. In a preferred embodiment, in the ISO/IEC 14443 protocol initialization and anti-collision processes, the second reception unit of the proximity card receives a select command transmitted by the proximity coupling device; and the second transmission unit returns information indicating that the proximity card supports the air interface security protection capability to the proximity coupling device, where the information can be carried by newly adding a value to the original values of the SAK and transmitted to the proximity coupling device via the SAK to notify the proximity coupling device that the proximity card has the air interface security protection capability.

Particular embodiments of the second transmission unit and the second reception unit of the proximity card can be as follows:

In a first example, the second reception unit receives the RATS including the security parameter request message transmitted by the proximity coupling device, where the message includes all of authentication mechanisms supported by the proximity coupling device and all of cipher algorithms supported by the proximity coupling device; and the second transmission unit returns the ATS to the proximity coupling device, where the ATS includes a combination of one of all the authentication mechanisms supported by the proximity coupling device and one of all the cipher algorithms supported by the proximity coupling device, both of which are selected by the second link setup unit according to the local strategy of the proximity card.

In a second example, the second reception unit receives the RATS including the security parameter request message transmitted by the proximity coupling device; and the second transmission unit returns the ATS to the proximity coupling device, where the ATS includes all of authentication mechanisms supported by the proximity card and all of cipher algorithms supported by the proximity card, so that the proximity coupling device can select a combination of one of all the authentication mechanisms supported by the proximity card and one of all the cipher algorithms supported by the proximity card as the security parameters as a result of the negotiation with the proximity card according to its local policy.

In a third example, the second reception unit receives the RATS including the security parameter request message transmitted by the proximity coupling device; and the second transmission unit returns the ATS to the proximity coupling device, where the ATS includes a combination of one of all of authentication mechanisms supported by the proximity card and one of all of cipher algorithms supported by the proximity card, both of which are selected by the second link setup unit as the security parameters as a result of the negotiation with the proximity coupling device.

In a fourth example, the second reception unit receives the RATS including the security parameter request message transmitted by the proximity coupling device, where the message includes a combination of one of all of authentication mechanisms and one of all of cipher algorithms supported by the proximity coupling device, both of which are selected by the proximity coupling device; and the second transmission unit returns the ATS to the proximity coupling device, where the ATS includes a result of judging by the second link setup unit whether it supports the combination of the authentication mechanism and the cipher algorithm in the RATS according to the local strategy of the proximity card.

Through the introduction of security capability notification, security parameter negotiation, identity authentication, confidential communication and other security mechanisms, the invention can enhance the security protection capability of the ISO/IEC 14443 air interface, and provide the proximity coupling device and the proximity card with the identity authentication function so as to ensure the legality and authenticity of the identities of both sides in communication, and can further provide the proximity coupling device and the proximity card with the confidential communication function as needed to thereby prevent communication data from being stolen, tampered or the like. Also the invention can well solve the problem of compatibility so that the air interface security ISO/IEC 14443 protocol can be fully compatible with the original ISO/IEC 14443 protocol, and the secure communication can be performed in the method of the invention only if both the proximity coupling device and the proximity card support the ISO/IEC 14443 protocol enhancing the security protection capability of the air interface. In another situation where only the proximity coupling device supports the ISO/IEC 14443 protocol with the security protection capability of the air interface, or only the proximity card supports the ISO/IEC 14443 protocol with the security protection capability of the air interface or the like, the proximity coupling device and the proximity card still use the original ISO/IEC 14443 protocol for communication. Moreover the ISO/IEC 14443 protocol enhancing the security protection capability of the air interface improves the system security without bring any additional hardware overhead of the proximity coupling device and the proximity card.

The objects, technical solutions and advantageous effects of the invention have been further described in details in the particular embodiments described above. It should be appreciated that the foregoing disclosure is merely the particular embodiments of the invention but not intended to limit the scope of the invention, and any modifications, equivalent substitutions, adaptations, etc., made without departing from the sprit and the principle of the invention shall come into the scope of the invention.

The invention claimed is:

1. An air interface security method, comprising in a transmission protocol process the steps of:
   1) a proximity coupling device transmitting a security parameter request message to a proximity card;
   2) the proximity card feeding back security parameters to the proximity coupling device after receiving the security parameter request message; and
   3) the proximity coupling device and the proximity card setting up a secure link between them according to the security parameters:
   wherein the step 1) further comprises:
   the proximity coupling device transmitting a Request for Answer To Select, RATS, including the security parameter request message to the proximity card to initiate security parameter negotiation with the proximity card;
   the step 2) further comprises:
   the proximity card returning an Answer To Select, ATS, to the proximity coupling device after receiving an RATS of the proximity coupling device, wherein the ATS includes information on a support condition of the proximity card for an authentication mechanism and a cipher algorithm;

the step 3) further comprises:

after the proximity coupling device negotiates about the security parameters with the proximity card, both of them performing identity authentication in accordance with an authentication mechanism as a result of negotiation, and setting up the secure link between the proximity coupling device and the proximity card upon successful identity authentication.

2. The air interface security method according to claim 1, wherein the step 3) further comprises:

the proximity coupling device and the proximity card generating a session key so that the proximity coupling device and the proximity card encrypt and transmit data by the session key for confidential communication.

3. The air interface security method according to claim 1, wherein the transmission protocol process is a transmission protocol process of ISO/IEC 14443 protocol.

4. The air interface security method according to claim 1, wherein before the step 1), the method further comprises:

step 0) the proximity card notifying the proximity coupling device that the proximity card has an air interface security protection capability in communication initialization and anti-collision processes.

5. The air interface security method according to claim 4, wherein the step 0) further comprises:

step 01) the proximity coupling device transmitting a select command to the proximity card; and step 02) the proximity card returning a response to the proximity coupling device after receiving the select command transmitted by the proximity coupling device, wherein the response includes information indicating that the proximity card supports the air interface security protection capability.

6. The air interface security method according to claim 5, wherein the step 02) further comprises:

the proximity card transmitting a Select AcKnowledge, SAK, to the proximity coupling device after receiving the select command transmitted by the proximity coupling device, wherein the SAK includes the information indicating that the proximity card supports the air interface security protection capability, and the information is carried by newly adding a value to original values of the SAK to notify the proximity coupling device selecting the proximity card that the proximity card has the air interface security protection capability.

7. The air interface security method according to claim 4, wherein the communication initialization and anti-collision processes are communication initialization and anti-collision processes of the ISO/IEC 14443 protocol.

8. The air interface security method according to claim 1, wherein the step 1) and the step 2) are particularly as follows:

in the step 1), the proximity coupling device transmits an RATS including the security parameter request message to the proximity card, wherein the security parameter request message includes all of authentication mechanisms supported by the proximity coupling device and all of cipher algorithms supported by the proximity coupling device; and in the step 2), after receiving the RATS, the proximity card firstly selects a combination of one of all the authentication mechanisms supported by the proximity coupling device and one of all the cipher algorithms supported by the proximity coupling device according to a local strategy, and then returns an ATS including the combination of the authentication mechanism and the cipher algorithm to the proximity coupling device.

9. The air interface security method according to claim 1, wherein the step 1) and the step 2) are particularly as follows:

in the step 1), the proximity coupling device transmits an RATS including the security parameter request message to the proximity card; and in the step 2), the proximity card returns an ATS to the proximity coupling device after receiving the RATS, wherein the ATS includes all of authentication mechanisms supported by the proximity card and all of cipher algorithms supported by the proximity card.

10. The air interface security method according to claim 1, wherein the step 1) and the step 2) are particularly as follows:

in the step 1), the proximity coupling device transmits an RATS including the security parameter request message to the proximity card; and in the step 2), after receiving the RATS, the proximity card selects a combination of one of all of its supported authentication mechanisms and one of all of its supported cipher algorithms and returns an ATS including the combination of the authentication mechanism and the cipher algorithm to the proximity coupling device.

11. The air interface security method according to claim 1, wherein the step 1) and the step 2) are particularly as follows:

in the step 1), the proximity coupling device transmits an RATS including the security parameter request message to the proximity card, wherein the security parameter request message includes a combination of one of all of authentication mechanisms supported by the proximity coupling device and one of all of cipher algorithms supported by the proximity coupling device, selected by the proximity coupling device; and in the step 2), after receiving the RATS, the proximity card judges whether it supports the combination of the authentication mechanism and the cipher algorithm in the RATS according to a local strategy and returns a judgment result to the proximity coupling device via an ATS.

12. An air interface security method, comprising in a transmission protocol process the steps of:

transmitting a security parameter request message to a proximity card;

receiving security parameters fed back from the proximity card; and setting up a secure link with the proximity card according to the security parameters:

wherein transmitting comprises:

transmitting a Request for Answer To Select, RATS, including the security parameter request message to the proximity card to initiate security parameter negotiation with the proximity card:

the receiving comprises:

receiving an Answer To Select, ATS, transmitted by the proximity card, wherein the ATS includes information on a support condition of the proximity card for an authentication mechanism and a cipher algorithm; and the setting up comprises:

performing identity authentication on the proximity card in accordance with an authentication mechanism among the negotiated security parameters after negotiating with the proximity card about the security parameters, and to set up the secure link with the proximity card upon successful identity authentication.

13. The air interface security method according to claim 12, wherein:

the transmitting further comprises: transmitting a select command to the proximity card; and the receiving further comprises: receiving a security capability of which the proximity card notifies the proximity coupling device.

14. An air interface security method, comprising in a transmission protocol process the steps of:

receiving a security parameter request message transmitted by a proximity coupling device;

feeding back security parameters to the proximity coupling device; and setting up a secure link with the proximity coupling device according to the security parameters;

wherein the receiving comprises:

receiving a Request for Answer To Select, RATS, including the security parameter request message transmitted by the proximity coupling device to initiate security parameter negotiation with the proximity card;

the transmitting comprises:

transmitting an Answer To Select, ATS, to the proximity coupling device, wherein the ATS includes information on a support condition of the proximity card for an authentication mechanism, a cipher algorithm; and the setting UP comprises:

performing identity authentication in accordance with an authentication mechanism among the negotiated security parameters after negotiating with the proximity coupling device about the security parameters, and to set up the secure link with the proximity coupling device upon successful identity authentication.

15. The air interface security method according to claim 14, wherein:

the receiving further comprises: receiving a select command transmitted by the proximity coupling device; and the transmitting further comprises: transmitting information indicating that the proximity card supports an air interface security protection capability to the proximity coupling device.

* * * * *